(12) United States Patent
Hirth et al.

(10) Patent No.: US 7,660,528 B2
(45) Date of Patent: Feb. 9, 2010

(54) METHOD AND SYSTEM FOR MITIGATING RAMAN CROSSTALK IN AN ETHERNET PASSIVE OPTICAL NETWORK

(75) Inventors: Ryan E. Hirth, Windsor, CA (US);
Lowell D. Lamb, San Ramon, CA (US);
Glen Kramer, Petaluma, CA (US);
Benjamin J. Brown, Chichester, NH (US)

(73) Assignee: Teknovus, Inc., Petaluma, CA (US)

( * ) Notice: Subject to any disclaimer, the term of this patent is extended or adjusted under 35 U.S.C. 154(b) by 574 days.

(21) Appl. No.: 11/431,342

(22) Filed: May 9, 2006

(65) Prior Publication Data

US 2006/0257148 A1 Nov. 16, 2006

Related U.S. Application Data

(60) Provisional application No. 60/680,807, filed on May 13, 2005.

(51) Int. Cl.
*H04J 14/02* (2006.01)
*H04B 10/24* (2006.01)

(52) U.S. Cl. .......................................... 398/72; 398/81
(58) Field of Classification Search ............. 398/71–72, 398/81, 42
See application file for complete search history.

(56) References Cited

U.S. PATENT DOCUMENTS

| | | | |
|---|---|---|---|
| 5,574,589 A | 11/1996 | Feuer et al. ................. 359/160 |
| 5,812,594 A | 9/1998 | Rakib .......................... 375/219 |
| RE36,471 E | 12/1999 | Cohen ......................... 359/127 |
| 6,771,413 B2 | 8/2004 | Cornwell et al. .......... 359/337.1 |
| 6,832,046 B1 | 12/2004 | Thomas ........................ 398/72 |
| 7,197,245 B1 * | 3/2007 | Islam et al. ................... 398/82 |
| 7,313,325 B2 * | 12/2007 | Han et al. ..................... 398/25 |
| 2006/0039699 A1 * | 2/2006 | Farmer et al. ................. 398/66 |
| 2006/0067705 A1 * | 3/2006 | Paulsen ....................... 398/164 |
| 2006/0140639 A1 * | 6/2006 | Effenberger ................. 398/159 |

\* cited by examiner

*Primary Examiner*—Leslie Pascal
(74) *Attorney, Agent, or Firm*—Park, Vaughan & Fleming LLP; Shun Yao

(57) ABSTRACT

One embodiment of the present invention provides a system for mitigating Raman crosstalk between downstream data and video transmission in an Ethernet passive optical network (EPON), wherein the EPON includes an optical line terminal (OLT) and one or more optical network units (ONU's). During operation, the system transmits a data stream from the OLT to the ONU's on a first wavelength that is substantially at 1490 nm. The system also transmits a video signal stream from the OLT to the ONU's on a second wavelength that is substantially at 1550 nm. The system modifies the bit sequence for the data stream to change the power spectral distribution (PSD) for the data stream, thereby reducing power spectral content in the frequency range where significant Raman crosstalk can occur between data and video signal streams.

18 Claims, 8 Drawing Sheets

METHOD AND SYSTEM FOR MITIGATING RAMAN CROSSTALK IN AN ETHERNET PASSIVE OPTICAL NETWORK

RELATED APPLICATION

This application hereby claims priority under 35 U.S.C. § 119 to U.S. Provisional Patent Application No. 60/680,807 filed on 13 May 2005, entitled "Method and Apparatus for Mitigation of Raman Crosstalk in EPON," by inventors Ryan E. Hirth, Benjamin J. Brown, Lowell D. Lamb, and Glen Kramer.

BACKGROUND

1. Field of the Invention

The present invention relates to the design of Ethernet passive optical networks. More specifically, the present invention relates to a method and a system for mitigating Raman crosstalk between downstream data and video channels in an Ethernet passive optical network.

2. Related Art

In order to keep pace with increasing Internet traffic, network operators have widely deployed optical fibers and associated optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs) (see FIG. 2). The OLT generally resides in the central office and couples the optical access network to a metro backbone, which can be an external network belonging to, for example, an Internet Service Provider (ISP) or a local exchange carrier. An ONU can reside either at the curb or at an end-user location, and can provide broadband voice, data, and video services. ONUs are coupled to a one-by-N (1×N) passive optical coupler, where N is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONU, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

A standard-compliant EPON can use two wavelength channels over the same fiber: 1310 nm for upstream data traffic and 1490 nm for downstream data traffic. The standard purposefully leaves an additional channel at 1550 nm for other applications which are not covered by the standard. One such typical application is downstream analog broadcast television (CATV) transmitted at 1550 nm. With multiple signal streams traveling on different wavelength channels through the same fiber, Raman crosstalk, resulting from Stimulated Raman Scattering (SRS), can occur and cause power transfer from a shorter-wavelength channel to a longer-wavelength channel. Raman crosstalk can reduce the signal-to-noise ratio (SNR) and introduce signal distortion to longer-wavelength channels. There are currently few approaches to mitigate Raman crosstalk in an EPON without introducing significant costs.

Hence, a need arises for a method and a system for cost-efficient mitigation of Raman crosstalk in an EPON.

SUMMARY

One embodiment of the present invention provides a system for mitigating Raman crosstalk between downstream data and video transmission in an Ethernet passive optical network (EPON), wherein the EPON includes an optical line terminal (OLT) and one or more optical network units (ONU's). During operation, the system transmits a data stream from the OLT to the ONU's on a first wavelength. During this process, the system also transmits a video signal stream from the OLT to the ONU's on a second wavelength. The system changes the bit sequence for the data stream to change the power spectral distribution (PSD) for the data stream, thereby reducing power spectral content in the frequency range where significant Raman crosstalk can occur between data and video signal streams.

In a variation of this embodiment, the first wavelength is substantially 1490 nm, and the second wavelength is substantially 1550 nm.

In a variation of this embodiment, changing the bit sequence for the data stream involves changing a standard idle pattern.

In a further variation, changing the standard idle pattern involves lengthening the standard IDLE ordered_sets based on the IEEE 802.3-2005 standard, thereby spreading the transmission power across a wide range of frequencies and reducing power at frequencies where significant Raman crosstalk can occur.

In a further variation, changing the standard idle pattern involves replacing a repeating 20-bit idle pattern with a repeating 80-bit idle pattern.

In a further variation, the 80-bit idle pattern includes the following ordered_sets based on the IEEE 802.3-2005 standard: /I1+/I2−/I1−/I2+/.

In a further variation, changing the standard idle pattern involves scrambling the idle pattern.

In a further variation, changing the standard idle pattern involves replacing idle periods with null packets addressed to an unused or null Logical Link Identifier (LLID), thereby reducing occurrences of repeating idle patterns.

In a further variation, the null packets include data with random or predetermined values, or values obtained with a predetermined method.

In a further variation, the system transmits specially chosen data in the null packets, thereby reducing power spectral content in the frequency range where significant Raman crosstalk can occur.

In a further variation, each null packet includes a repeating hexadecimal value of B5, which after 8B/10B encoding results in a constantly repeating pattern of "... 1010101010 ..."

A further embodiment of the present invention provides a system for mitigating Raman crosstalk between downstream data and video transmission in an EPON, wherein the EPON includes an OLT and one or more ONU's. During operation, the system transmits a data stream from the OLT to the ONU's on a first wavelength that is substantially at 1490 nm. The system also transmits a video signal stream from the OLT to the ONU's on a second wavelength that is substantially at 1550 nm. The system further reduces transmission power for the data stream, and applies forward error correction (FEC) to the data stream, thereby mitigating the effect of Raman crosstalk on the video transmission without significantly reducing the signal-to-noise ratio (SNR) for the data transmission.

A further embodiment of the present invention provides a system for mitigating Raman crosstalk between downstream data and video transmission in an EPON, wherein the EPON includes an OLT and one or more ONU's. During operation, the system transmits a data stream from the OLT to the ONU's on a first wavelength that is substantially at 1490 nm through a first fiber. The system also transmits a video signal stream from the OLT to the ONU's on a second wavelength that is substantially at 1550 nm through a second fiber. An optical combiner combines the two streams propagating through the two fibers immediately prior to splitting the combined streams for distribution to the ONU's, thereby minimizing the distance over which the two streams co-propagate and mitigating the effect of Raman crosstalk.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application specific integrated circuits (ASICs), field-programmable gate arrays (FPGAs), semiconductor memories, magnetic and optical storage devices such as disk drives, magnetic tape, and CDs (compact discs) and DVDs (digital versatile discs or digital video discs).

Passive Optical Network Topology

Figure 1:
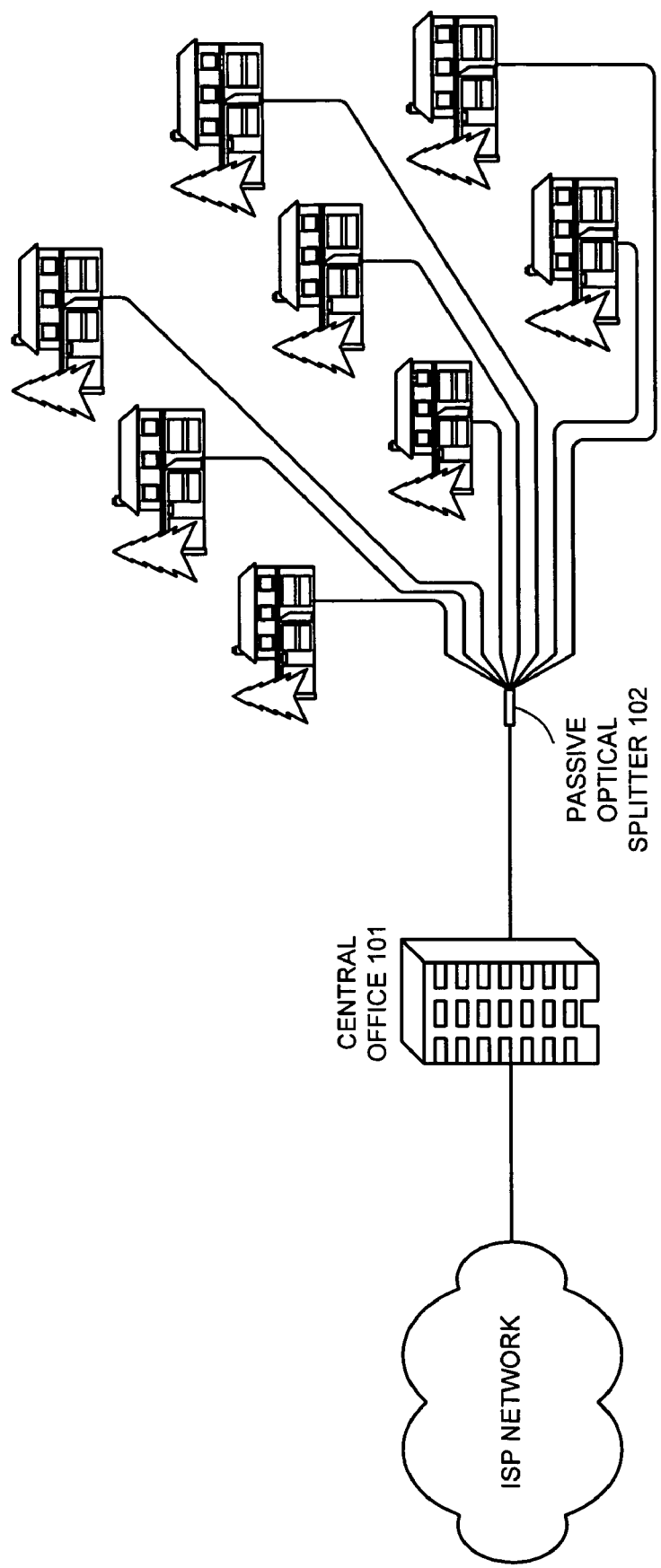
FIG. 1 illustrates an EPON wherein a central office and a number of subscribers are coupled through optical fibers and an Ethernet passive optical splitter (prior art).

FIG. 1 illustrates a passive optical network including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

Trunk Overlay Configuration of EPON

Figure 2:
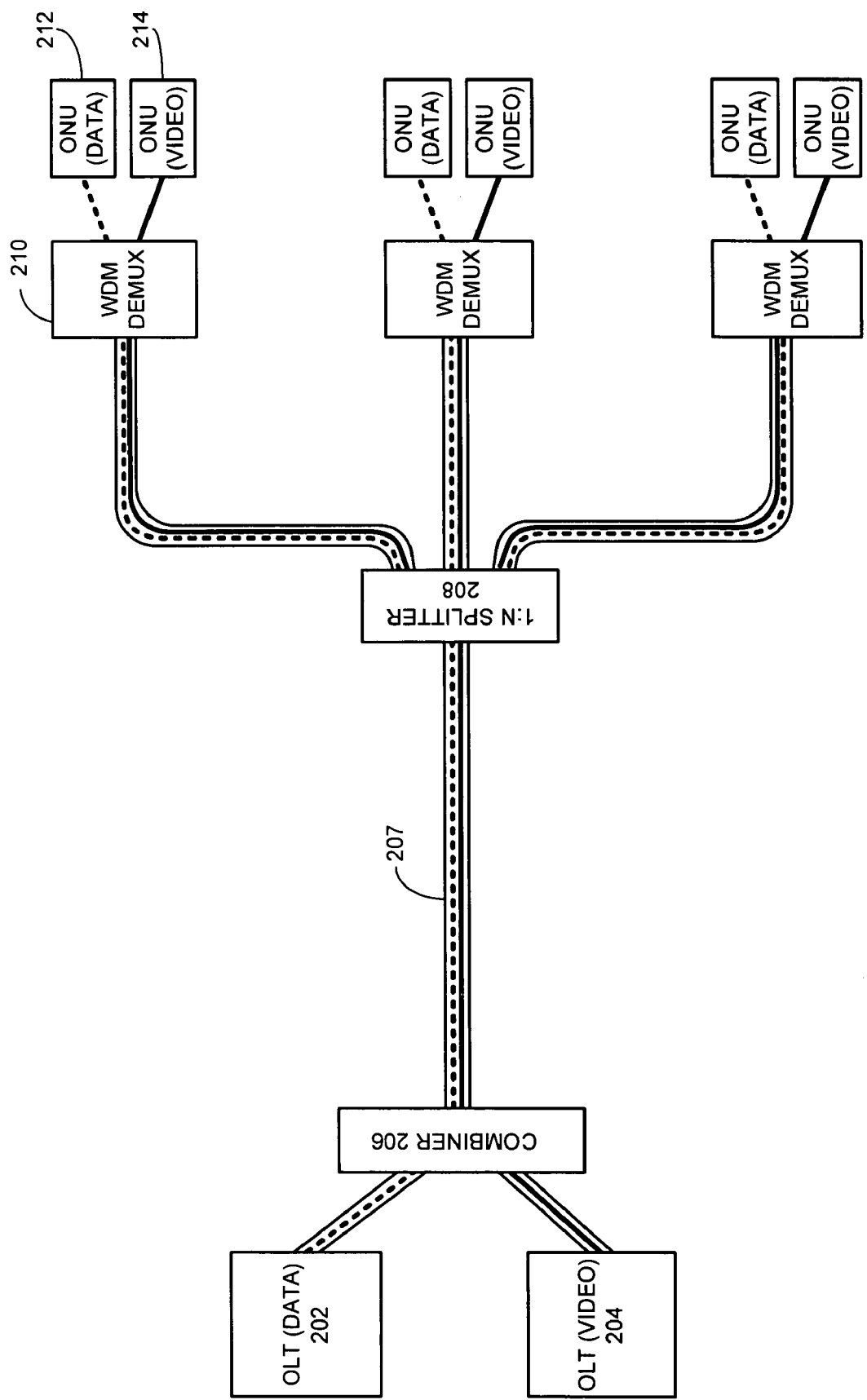
FIG. 2 illustrates an EPON in a conventional trunk overlay configuration (prior art).

FIG. 2 illustrates an EPON in a conventional trunk overlay configuration (prior art). The EPON in this example facilitates delivery of both data traffic and video content such as TV programs. Typically, on the head end, two OLTs are respectively responsible for data and video traffic. In this example, OLT 202 transmits downstream data and receives upstream data, and OLT 204 transmits downstream video content. OLTs 202 and 204 transmit in the downstream direction using two separate wavelength channels, which are combined by a 2:1 optical combiner 206 and further transmitted over a trunk fiber 207.

Trunk fiber 207 can accommodate multiple wavelength channels and operate in a wavelength-division multiplexed (WDM) mode. The two signal streams on the two wavelength channels, represented by a dashed line and a solid line, respectively, travel through trunk fiber 207 before reaching a 1:N splitter 208. 2:1 optical combiner 206 can reside in a network operator's premise, such as a central office. 1:N splitter 208 can reside in a user premise, such as a business campus or a residential area. The network can use a single strand of fiber, such as trunk fiber 207, to provide both upstream and downstream connectivity between 2:1 combiner 206 and 1:N splitter 208. Other configurations without the use the 2:1 combiner are also possible.

1:N splitter 208 splits the downstream optical signals to N branches, assuming that there are N users. At each user's location, a WDM demultiplexer (DEMUX) separates the two wavelength channels and forwards each channel to an appropriate ONU. For example, WDM DEMUX 210 separates the data channel and video channel, and forwards the two channels to ONU 212 and ONU 214, respectively. ONU 212 receives downstream data and allows the user to send upstream data. ONU 214 receives downstream video content and forwards the content to one or more video receiving devices, such as set-top boxes, video recorders, or displays. Note that upstream data traffic is carried on a third wavelength channel which is not shown in FIG. 2. Multiple ONUs share this upstream data channel and transmit upstream data in a time-division multiplexed (TDM) manner. The upstream data wavelength travels though 1:N splitter 208, which can function as an N:1 combiner in the upstream direction, trunk fiber 207, and optical combiner 206 to reach OLT 202.

Because the transmission of downstream data traffic, downstream video content, and upstream data traffic uses three different wavelength channels, Raman crosstalk can occur and introduce non-negligible transmission impairments to the optical signals. Raman crosstalk is the result of Stimulated Raman Scattering (SRS). SRS is caused by the nonlinear response of a transparent optical medium, such as silica in an optical fiber, to the intensity of light propagating through the medium. A non-instantaneous response is caused by vibrations of the crystal (or glass) lattice. Such nonlinear and non-instantaneous response results in energy transfer from a shorter-wavelength signal to a longer-wavelength signal, which is referred to as "Raman gain." Raman gain is generally the highest between wavelengths spaced 60 nm to 140 nm apart, with a significant peak at a wavelength separation of 100 nm.

Raman gain can result in desirable amplification of optical signals, when the shorter-wavelength signal is an un-modulated continuous wave working as a "pump." By injecting a pump signal into a fiber of a certain length, typically in the range of 20 Km, one can convert the fiber into a distributed Raman amplifier, which can replace discreet amplifiers for longer-wavelength signals. However, Raman gain can also introduce undesirable crosstalk. Raman crosstalk occurs when two signal streams carried by two wavelength channels co-propagate through the same fiber and the energy from the shorter-wavelength channel transfers to the longer-wavelength channel. This energy transfer introduces additional noise to the shorter-wavelength channel. In EPON applications, Raman crosstalk is detrimental to signal streams transmitted in longer-wavelength channels and can reduce their SNR.

According to the IEEE 802.3-2005 standard, EPONs use two different wavelength channels over the same trunk fiber: 1310 nm for upstream data traffic and 1490 nm for downstream data traffic. Typically, an additional channel at 1550 nm is used for transmitting downstream analog broadcast TV content. The wavelength of upstream data channel is sufficiently distanced from the wavelengths of the other two channels and produces negligible Raman gain. However, detectable Raman gain exists between the 1490 nm downstream data channel and the 1550 nm downstream broadcast TV channel. This undesirable Raman crosstalk can result in interference patterns on a user's TV screen for multiple channels. The Raman crosstalk is typically more pronounced in the low baseband frequency range, typically for frequencies below 125 MHz, due to the periodic nature of Gigabit Ethernet idle codes. In North America, this frequency range covers TV channels 2 through 6. The channel designation may be different in other parts of the world. Embodiments of the present invention provide several approaches for mitigating Raman crosstalk in an EPON.

Reducing Optical Intensity and Using FEC

Past research has shown that, for Raman crosstalk, the carrier-to-crosstalk ratio (CCR) is inversely proportional to the square of the interfering signal's power. In one embodiment of the present invention, the OLT reduces the transmission power of the downstream data signal, thereby reducing the optical intensity of the 1490 nm downstream data channel. However, lower transmission power can result in a lower SNR for the 1490 nm channel. To compensate for the SNR reduction, the OLT can employ a forward error correction (FEC) for the downstream data transmission. An FEC scheme can provide up to 6 dB of net effective coding gain. In addition, the system can use shorter links and fewer passive splitters to reduce propagation and insertion loss along the optical transmission path.

Branch Overlay Configuration of EPON

Raman crosstalk occurs when multiple optical signals on different wavelengths co-propagate in the same fiber strand. Raman crosstalk is a function of the length of the fiber. In an EPON with a conventional trunk overlay configuration, as is shown in FIG. 2, a significant amount of Raman crosstalk can be contributed to the trunk fiber between a central office and user premises. This single fiber trunk can run for kilometers before branching out to individual subscribers at a passive optical splitter. The shorter-distance branch fibers typically contribute less Raman crosstalk.

Figure 3:
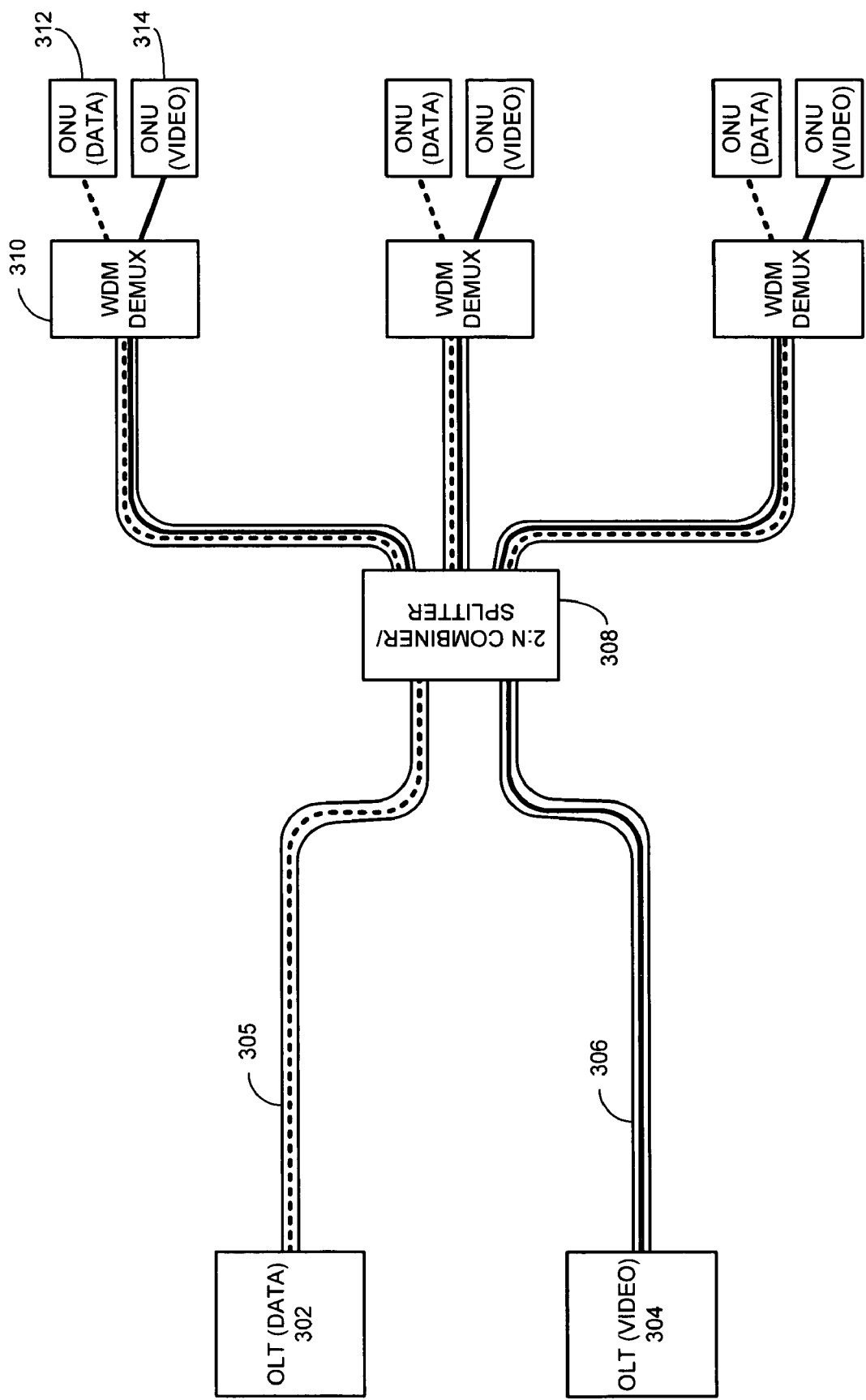
FIG. 3 illustrates an EPON in a branch overlay configuration in accordance with one embodiment of the present invention.

One embodiment of the present invention uses two fibers, instead of one, to provide the link between the OLTs and the optical splitter and to reduce the co-propagation distance of downstream data and video signals. FIG. 3 illustrates an EPON in a branch overlay configuration in accordance with one embodiment of the present invention. OLT 302 transmits downstream data and receives upstream data, and OLT 304 transmits downstream video content.

OLT 302 transmits downstream and receives upstream data signals through a first trunk fiber 305, where the downstream data stream is represented in a dashed line. Downstream video signal, on the other hand, is transmitted in a second trunk fiber 306, where the downstream video signal stream is represented in a solid line. Therefore, the 1490 nm channel and, the 1550 nm channel propagate in two separate trunk fibers and experience less Raman crosstalk than in a trunk-overlay configuration. A 2:N combiner/splitter 308 combines fibers 305 and 306, and splits the combined optical signals to N branches. At each user's location, a WDM DEMUX separates the two downstream channels and forwards each channel to an appropriate ONU. For example, WDM DEMUX 310 separates the data channel and video channel, and forwards the two channels to ONU 312 and ONU 314, respectively. ONU 312 receives the downstream data and allows the user to send upstream data. ONU 314 receives the downstream video content and forwards the content to one or more display devices. Note that the upstream data traffic is carried on a third wavelength channel which is not shown in FIG. 3. Multiple ONUs share this upstream channel and transmit upstream data in a TDM manner. The upstream channel propagates though 2:N combiner/splitter 308 and trunk fiber 305 to reach OLT 302.

Controlling Power Spectral Distribution

In general, transmission of data in an EPON complies with the Gigabit Ethernet (GbE) standards. Since Raman crosstalk is most pronounced at baseband frequencies below 125 Mhz, embodiments of the present invention provide a system that reduces the power distribution at such frequencies with GbE data transmission. Based on the GbE standards, each bit occupies the full period of a 1.25 GHz transmission clock. The frequency of this digital transmission and the corresponding harmonics are higher than the frequencies of concern for the 1550 nm video wavelength. Hence, to identify the source of the Raman crosstalk, a closer analysis of the GbE data channel is proper.

The GbE data transmission employs 8B/10B encoding, where each byte of data, or octet, is mapped to two 10-bit sequences (called "code groups"). The reason for having two 10-bit code groups is to maintain a balanced running disparity and a high frequency of transitions for synchronization purposes. Typically, one of the two code groups has six "1"s and four "0"s, which is used when the running disparity is negative. The other of the two code groups has four "1"s and six "0"s, which is used when the running disparity is positive. For other data bytes, both of the corresponding 10-bit code groups have equal number of "1"s and "0"s to preserve the running disparity.

For example, an octet of hexadecimal value 50 (01010000 in binary format) is mapped to code group 0110110101 (to be used with a negative current running disparity) and code group 1001000101 (to be used with a positive current running disparity). This pair of code groups are identified as "D16.2". "D" indicates that this pair of code groups are used for data. "16" is the decimal value of the lower five bits of the octet ("10000"), and "2" is the decimal value of the higher three bits of the octet ("010"). For convenience, a 10-bit code group can be expressed as a three-digit hex number, wherein the three digits represent the values of the highest two bits, the middle four bits, and the lowest four bits. Thus, 1001000101 is expressed as "245".

Besides data code groups, there are also special code groups used for control purposes. For example, "K28.5" corresponds to code groups 0011111010 (for negative running disparity) and 1100000101 (for positive running disparity). Note that "K" indicates that it is a special code group, and "28.5" indicates the corresponding octet value BC (or 10111100 in binary format). The IEEE Standard 802.3-2005 "Local and Metropolitan Area Networks" (hereinafter "IEEE 802.3-2005 standard") includes a complete list of 8B/10B code groups.

The IEEE 802.3-2005 standard also defines special control sequences, which are called "ordered_sets." For example, ordered_set /I1/, which includes two code groups /K28.5/ D5.6/, is one of the IDLE ordered_sets. It is defined such that the running disparity at the end of the transmitted /I1/ is opposite to that of the beginning running disparity. The IDLE ordered-set /I2/ (/K28.5/D16.2/) is defined such that the running disparity at the end of the transmitted /I2/ is the same as the beginning running disparity. IDLE ordered_set /I1/ following a packet or a control sequence can restore the current positive running disparity to negative. All subsequent IDLEs are /I2/ to ensure a negative running disparity. Other ordered_ sets include /R/ (Carrier Extend, /K23.7/), /S/ (Start of Packet, /K27.8/), and /T/ (End of Packet, /K29.7/).

According to IEEE 802.3-2005 standard, in the absence of data, the full-duplex media access control (MAC) device transmits idle codes. The largest power spectral distribution (PSD) peaks arise from repeating bit patterns. Particularly, the repeating idle patterns produce numerous peaks. Embodiments of the present invention provide a system for controlling and reducing the PSD peaks below 125 Mhz, thereby reducing the Raman crosstalk interferences to the broadcast TV signals.

The idle pattern of 1000BASE-X physical coding sublayer ("PCS"), which is the coding format used by EPONs, includes repeating ordered_sets of two 10-bit code groups. Depending upon the frequency of packet arrival, the same IDLE ordered_sets can be transmitted continuously for an extended period, resulting in a repeating 20-bit pattern, which produce power peaks at frequencies within the 125 Mhz range.

Figure 4:
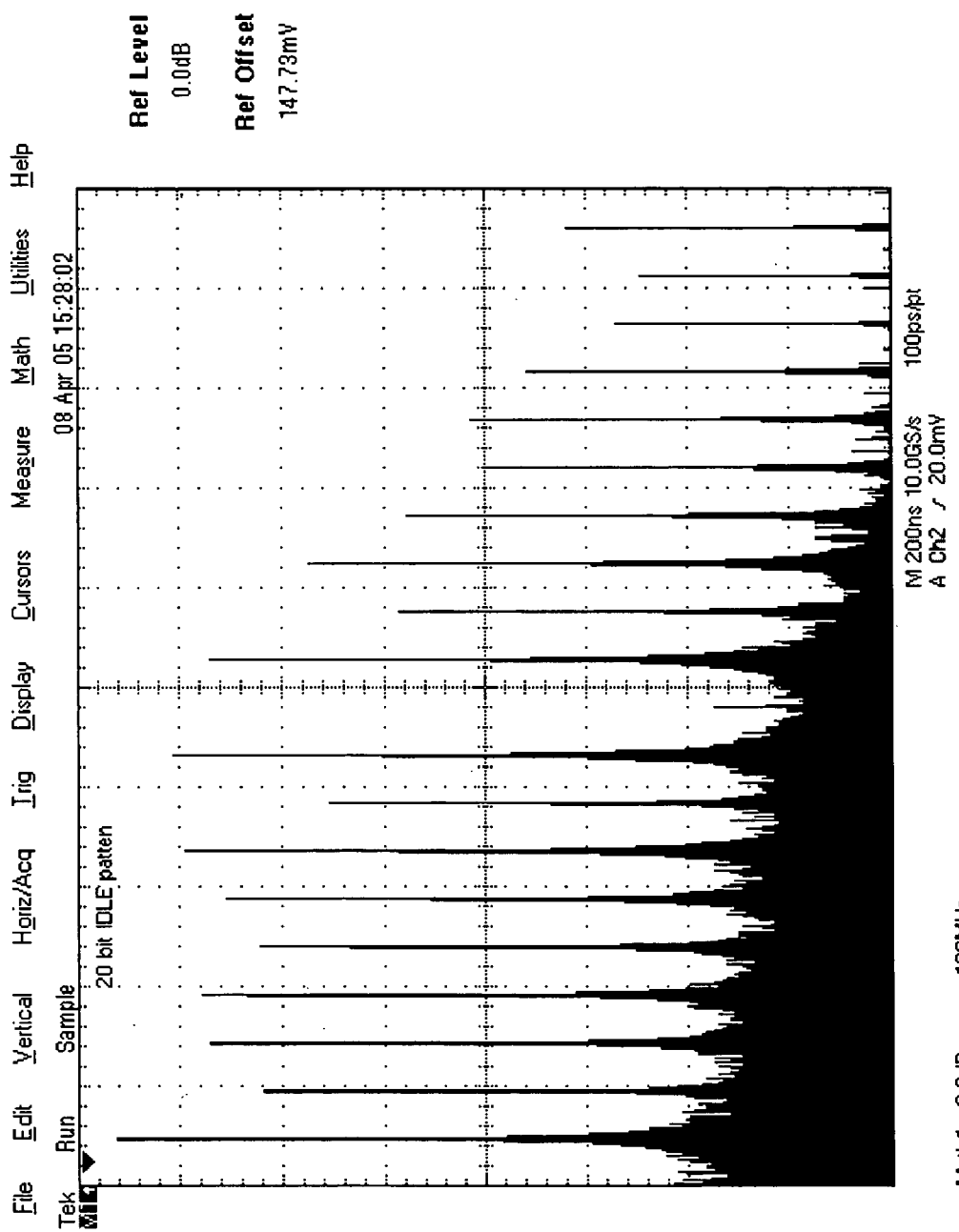
FIG. 4 illustrates the power spectral distribution of the standard repeating 20-bit idle pattern.

FIG. 4 illustrates the power spectral distribution of the standard repeating 20-bit idle pattern. Note that each horizontal division is 130 MHz. As can be seen in FIG. 4, many pronounced peaks are present. The first two peaks, which are at 62.5 MHz and 125 MHz, are within the frequency range where Raman crosstalk is of concern.

In one embodiment, the system lengthens the IDLE pattern, thereby spreading the power across a wider range of frequencies and reducing power at certain discrete frequencies where most interference occurs. This modification, although not complying with the standard, does not break 8B/10B coding rules. A standard compliant receiver can receive such modified idle patterns without errors.

As described above, the IEEE 802.3-2005 standard specifies two IDLE ordered_sets, /I1/ and /I2/. Because a code group corresponds to two 10-bit sequences, these two ordered_sets can generate four different bit sequences while preserving their disparity flipping or preservation functions. Specifically, /I1/ includes an /I1+/ bit sequence which flips a running disparity from positive to negative and an /I1−/ bit sequence which flips a running disparity from negative to positive. Similarly, /I2/ includes two bit sequences, /I2+/ and /I2−/, both of which preserve the current running disparity.

Typically, the /I1−/ and /I2+/ bit sequences are not used in transmission. In one embodiment of the present invention, an OLT combines these four bit patterns during long idle periods to generate a repeating 80-bit pattern to replace the conventional 20-bit pattern. This repeating 80-bit pattern can be: . . . /I1+/I2−/I1−/I2+/I1+/I2−/I1−/I2+/ . . . Note that when FEC is used, the start of a packet is delineated with the S_FEC ordered_set. Because a packet delineator follows a period of idles, the S_FEC is generally expected to begin with a negative running disparity. Some receivers may be built to only expect S_FEC ordered_sets to begin with a negative running disparity. Therefore, when transmitting the longer 80-bit IDLE pattern, if the transmitter has not just transmitted an /I1+/ or /I2−/, the transmitter can immediately insert an /I1+/ to flip the positive running disparity to negative before transmitting the S_FEC.

Figure 5:
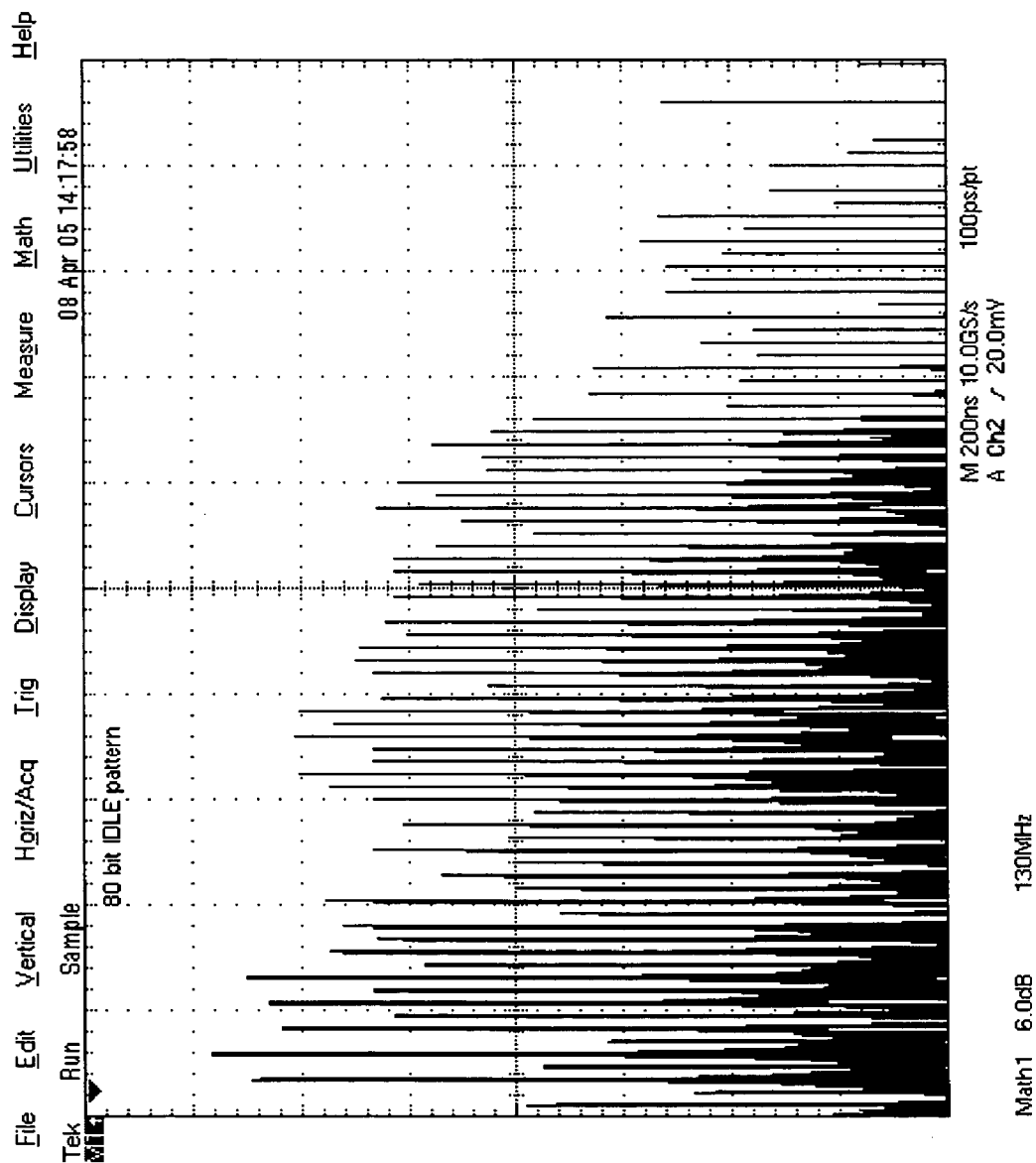
FIG. 5 illustrates the power spectral distribution of a modified repeating 80-bit idle pattern in accordance with one embodiment of the present invention.

FIG. 5 illustrates the power spectral distribution of a modified repeating 80-bit idle pattern in accordance with one embodiment of the present invention. Compared with the repeating 20-bit pattern, the repeating 80-bit pattern produces more peaks with generally lower amplitudes, and peaks near 62.5 MHz are significantly lower than those produced by the repeating 20-bit pattern.

In a further embodiment, the system can reduce the sub-125 MHz power of an idle pattern by scrambling the 10-bit code groups. Such scrambling can result in a random data pattern that spreads the power more evenly over a wide spectral range. The system can use various scrambling schemes. For instance, the system can use the channel cipher for Twisted Pair Physical layer Medium Dependent (TP-PMD) scrambling in Fiber Distributed Data Interface (FDDI), which is also used in 100BASE-TX Ethernet transmission. In a further embodiment, the system can use the Synchronous Optical Network (SONET) scrambler, which is also used in Gigabit Passive Optical Networks (GPONs) defined by the International Telecommunication Union (ITU).

Scrambling the idle patterns, however, could increase DC content in the bit stream and result in long run lengths of the signal. Consequently, the clock recovery module is expected to support large numbers of consecutive repeating bit patterns. Furthermore, baseline wander could also occur in AC coupled circuits, which are commonly used in optical networks.

Figure 6:
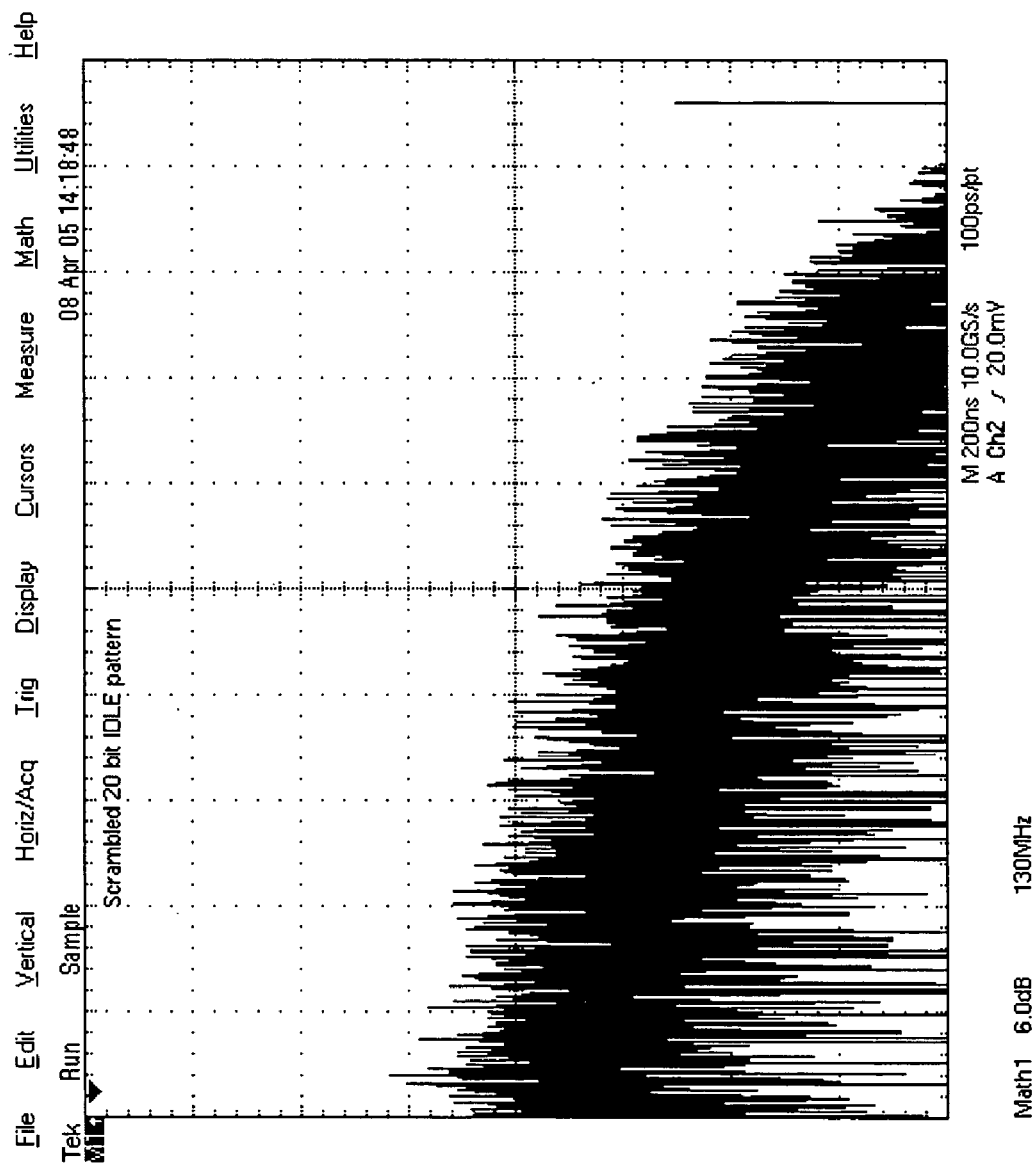
FIG. 6 illustrates the power spectral distribution of a scrambled repeating 20-bit idle pattern in accordance with one embodiment of the present invention.

FIG. 6 illustrates the power spectral distribution of a scrambled repeating 20-bit idle pattern in accordance with one embodiment of the present invention. The power spectral content is significantly reduced at frequencies where the standard repeating 20-bit pattern produces peaks. However, although the high peaks are eliminated, a significantly higher spectral content is present across the sub-125 MHz frequencies.

A further embodiment of the present invention can mitigate the effects of long periods of IDLE patterns and still retain a low DC content in the running bit streams. According to this embodiment, an OLT replaces long periods of IDLE patterns with packets with arbitrary length addressed to an unknown or null LLID. An ONU receiving such a packet generally does not process the data contained therein after identifying the packet's LLID as an unused or null LLID. Accordingly, such packets are referred to as "null packets" in the following description. In one embodiment, such null packets can have random lengths and contain incrementing 8-bit data. This approach does not require additional hardware or modification of existing hardware, and can be readily implemented with an upgrade of existing equipment in the central office. During operation, the OLT can immediately terminate the transmission of null packets by inserting an end-of-packet delimiter when packets carrying useful data are ready for transmission to minimize latency.

Figure 7:
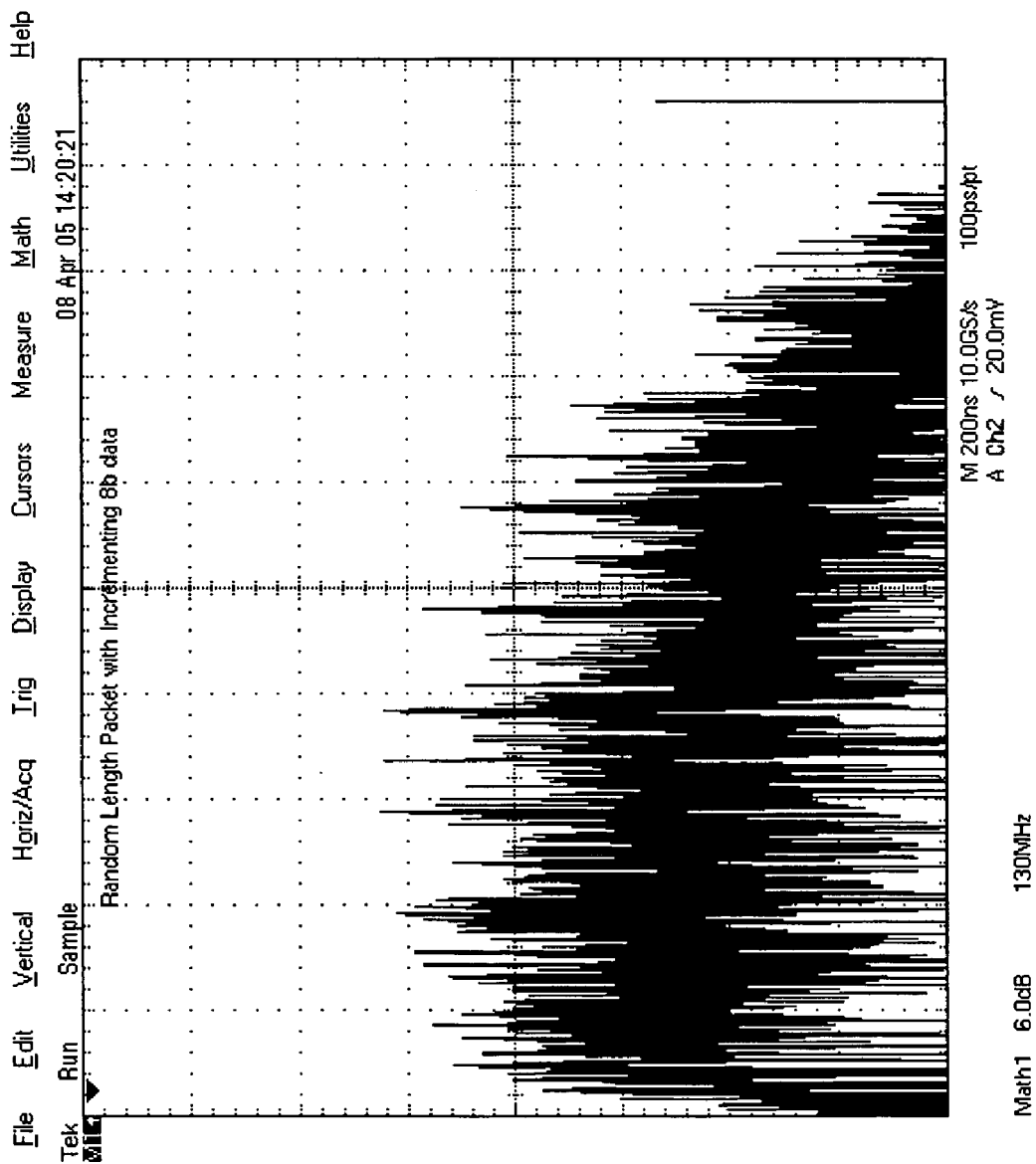
FIG. 7 illustrates the power spectral distribution of random-length packets with incrementing 8-bit data which replace the standard idle patterns, in accordance with one embodiment of the present invention.

FIG. 7 illustrates the power spectral distribution of random-length packets with incrementing 8-bit data which replace the standard idle patterns, in accordance with one embodiment of the present invention. The spectral content as is shown in FIG. 7 is significantly reduced at frequencies where the standard repeating 20-bit pattern produces peaks. Further, unlike the power spectrum of the scrambled data pattern, the spectral content in the sub-125 MHz frequency range remains relatively low. By inserting null packets, the system can effectively control the Raman crosstalk while fully complying with the standards.

The bit-stream pattern of data packets, either useful or null, is effectively random and contains a large number of frequency components. Such bit-stream pattern still exhibit a certain amount of power in the sub-125 MHz frequency range. In further embodiments of the present invention, an OLT can fill the null packets with specially selected bit sequences to shift the power spectral distribution well outside this frequency range of interest. By doing so, the system further lowers the average power and removes the peaks in the sub-125 MHz frequency range.

In one embodiment, the OLT replaces idle periods with random-length null packets that contain a constantly repeating octet of B5. Based on the 8B/10B encoding format, the 10-bit code groups for B5 are two identical bit sequences "1010101010." Hence, the null packets produce a repeating bit-stream pattern of " . . . 1010101010 . . . " with constantly alternating "0" and "1" bits.

Figure 8:
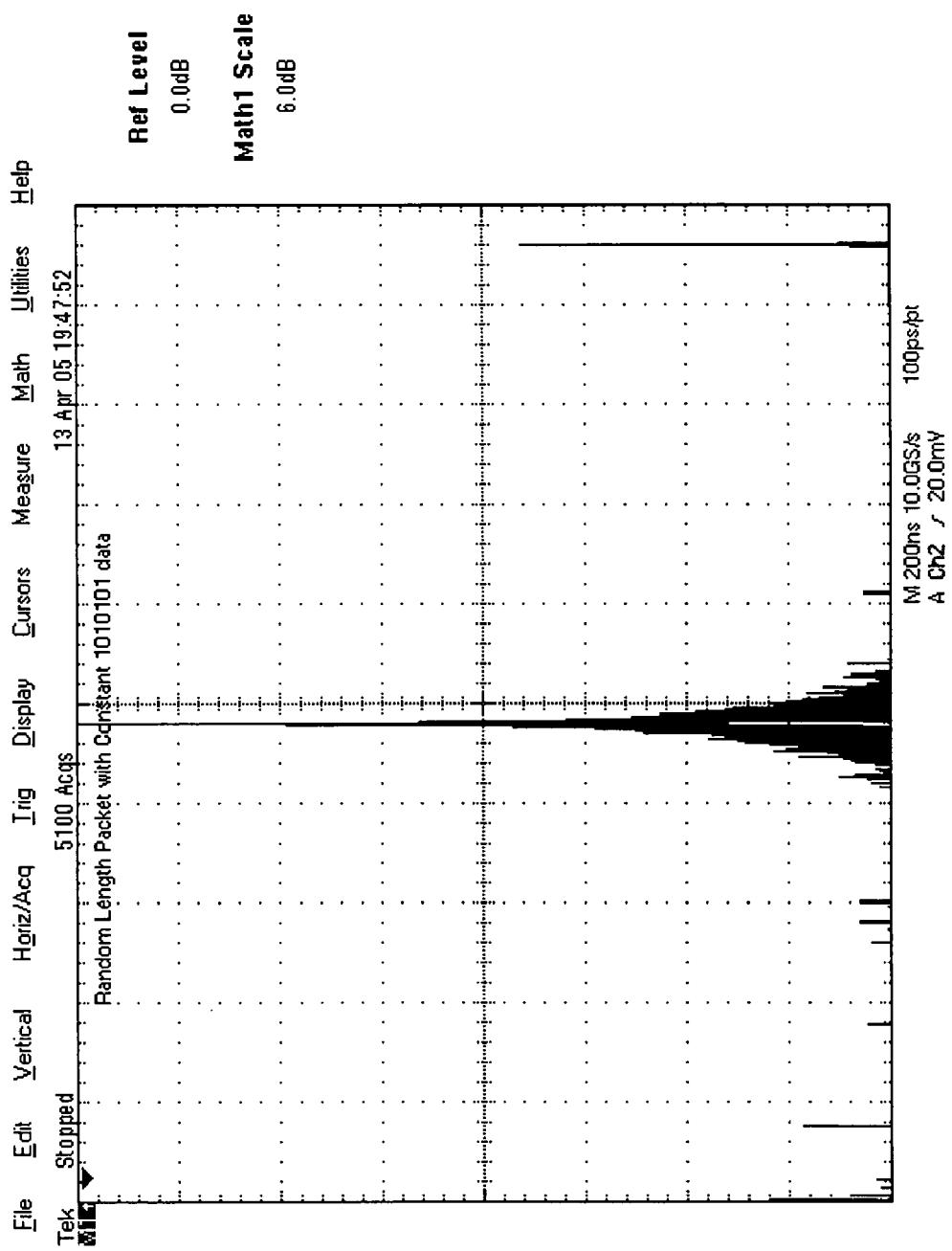
FIG. 8 illustrates the power spectral distribution of random-length packets with constantly alternating "0" and "1" bits which replace the standard idle patterns, in accordance with one embodiment of the present invention.

FIG. 8 illustrates the power spectral distribution of random-length packets with constantly alternating "0" and "1" bits which replace the standard idle patterns, in accordance with one embodiment of the present invention. This, bit-stream pattern produces a predominant peak at 625 MHz, which is well outside the frequency range of interest. The power spectrum exhibits little spectral content at the lower frequency range. Therefore, the system can significantly reduce Raman crosstalk by transmitting null packets with alternating "0" and "1" bits during idle periods. Note that when the network is operating at full or nearly full downstream bandwidth, the power spectrum looks similar to that shown in FIG. 7. However, when the downstream data traffic is light, this method can considerably reduce Raman crosstalk.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for mitigating Raman crosstalk between downstream data and video transmission in an Ethernet passive optical network (EPON), wherein the EPON includes an optical line terminal (OLT) and one or more optical network units (ONU's), the method comprising:
    transmitting a data stream from the OLT to the ONU's on a first wavelength;
    transmitting a video signal stream from the OLT to the ONU's on a second wavelength; and
    changing the bit sequence for the data stream to change the power spectral distribution (PSD) for the data stream, thereby reducing power spectral content in the frequency range where significant Raman crosstalk can occur between data and video signal streams, wherein changing the bit sequence for the data stream involves changing a standard idle pattern by lengthening the IDLE ordered sets based on the IEEE 802.3-2005 standard, thereby spreading the transmission power across a wide range of frequencies and reducing power at frequencies where significant Raman crosstalk can occur.

2. The method of claim 1, wherein the first wavelength is substantially 1490 nm, and the second wavelength is substantially 1550 nm.

3. The method of claim 1, wherein changing the standard idle pattern involves replacing a repeating 20-bit idle pattern with a repeating 80-bit idle pattern.

4. The method of claim 3, wherein the 80-bit idle pattern includes the following ordered sets based on the IEEE 802.3-2005 standard:
    /I1+/I2-/I1-/I2+/.

5. The method of claim 1, wherein changing the standard idle pattern involves scrambling the idle pattern.

6. The method of claim 1, wherein changing the standard idle pattern involves replacing idle periods with null packets addressed to an unused or null Logical Link Identifier (LLID), thereby reducing occurrences of repeating idle patterns.

7. The method of claim 6, wherein the null packets include data with random or predetermined values, or values obtained with a predetermined method.

8. The method of claim 6, further comprising transmitting specially chosen data in the null packets, thereby reducing power spectral content in the frequency range where significant Raman crosstalk can occur.

9. The method of claim 8, wherein each null packet includes a repeating hexadecimal value of B5, which after 8B/10B encoding results in a constantly repeating pattern of "... 1010101010 ..."

10. A system for mitigating Raman crosstalk between downstream data and video transmission in an EPON, wherein the EPON includes an OLT and one or more ONU's, the system comprising:
- a first transmission mechanism configured to transmit a data stream from the OLT to the ONU's on a first wavelength;
- a second transmission mechanism configured to transmit a video signal stream from the OLT to the ONU's on a second wavelength; and
- a modification mechanism configured to change the bit sequence for the data stream to change the power spectral distribution (PSD) for the data stream, thereby reducing power spectral content in the frequency range where significant Raman crosstalk can occur between data and video signal streams, wherein while changing the bit sequence for the data stream, the modification mechanism is configured to change a standard idle pattern by lengthening the IDLE ordered sets based on the IEEE 802.3-2005 standard, thereby spreading the transmission power across a wide range of frequencies and reducing power at frequencies where significant Raman crosstalk can occur.

11. The system of claim 10, wherein the first wavelength is substantially 1490 nm, and the second wavelength is substantially 1550 nm.

12. The system of claim 10, wherein while changing the standard idle pattern, the modification mechanism is configured to replace a repeating 20-bit idle pattern with a repeating 80-bit idle pattern.

13. The system of claim 12, wherein the 80-bit idle pattern includes the following ordered sets based on the IEEE 802.3-2005 standard:
/I1+/I2−/I1−/I2+/.

14. The system of claim 10, wherein while changing the standard idle pattern, the modification mechanism is configured to scramble the idle pattern.

15. The system of claim 10, wherein while changing the standard idle pattern, the modification mechanism is configured to replace idle periods with null packets addressed to an unused or null Logical Link Identifier (LLID), thereby reducing occurrences of repeating idle patterns.

16. The system of claim 15, wherein the null packets include data with random or predetermined values, or values obtained with a predetermined method.

17. The system of claim 15, wherein the modification mechanism is configured to fill the null packets with specially chosen data, thereby reducing power spectral content in the frequency range where significant Raman crosstalk can occur.

18. The system of claim 17, wherein the modification is configured to fill the null packets with a repeating hexadecimal value of B5, which after 8B/10B encoding results in a constantly repeating pattern of
"... 1010101010 ..."

* * * * *